US007224836B2

(12) United States Patent
Sarkar (10) Patent No.: US 7,224,836 B2
(45) Date of Patent: May 29, 2007

(54) SYSTEMS AND METHODS FOR STYLE CONSCIOUS FIELD CLASSIFICATION

(75) Inventor: Prateek Sarkar, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 685 days.

(21) Appl. No.: 10/324,151

(22) Filed: Dec. 20, 2002

(65) Prior Publication Data
US 2004/0120582 A1   Jun. 24, 2004

(51) Int. Cl.
*G06K 9/62* (2006.01)
*G06K 9/74* (2006.01)

(52) U.S. Cl. .................................... 382/228
(58) Field of Classification Search ............ 382/228
See application file for complete search history.

(56) References Cited

U.S. PATENT DOCUMENTS

| | | | |
|---|---|---|---|
| 5,526,444 | A | 6/1996 | Kopec et al. |
| 6,038,351 | A * | 3/2000 | Rigakos ............... 382/305 |
| 6,678,415 | B1 | 1/2004 | Popat |
| 6,678,418 | B2 | 1/2004 | Chen |

OTHER PUBLICATIONS

Sarkar et al., "Classification of Style-Constrained Pattern-Fields", Proceedings of the 15th ICPR, vol. 2, pp. 859-862, Barcelona, Sep. 2000.
Sarkar et al., "Style Consistency in Isogenous Patterns" in Proceedings of the 15th ICPR, vol. 2, pp. 859-862, Barcelona, Sep. 2000.
Sarkar et al., "Triage of OCR Results Using 'Confidence' Scores" In Proceedings of SPIE/IS&T 2002 Document Recognition & Retrieval IX Conf. (DR&R IX), San Jose, CA Jan. 2002.
Prateek Sarkar, "Style Consistency in Pattern Fields" Rennselaer Polytechnic Institute, Ph.D. Thesis, Troy, NY, 2000.
Prateek Sarkar et al., "Style Consistency in Isogenous Patterns" in Proceedings of the Sixth International Conference for Pattern Recognition, pp. 1169-1174, Seattle, WA, Sep. 2001.
Prateek Sarkar, An Iterative Algorithm for Optimal Style Conscious Field Classification (ICPR'02), in Proceedings of the 16th International Conference on Pattern Recognition, vol. 4, p. 40243, IEEE Computer Society, Quebec City, Canada, 2002.
Prateek Sarkar et al., "Classification of style-constrained pattern-fields", in Proceedings of the 15th ICPR, pp. 859-862, IEEE Computer Society Press, Barcelona, 2000.
Prateek Sarkar, "Style Consistent Classification of Isogenous Patterns" in IEEE Transactions on Pattern Analysis and Machine Intelligence, vol. 27, No. 1, pp. 88-98, Jan. 2005.

* cited by examiner

*Primary Examiner*—Joseph Mancuso
*Assistant Examiner*—Jonathan Schaffer
(74) *Attorney, Agent, or Firm*—Christian Austin-Hollands (57) ABSTRACT

Techniques are provided to classify patterns in isogenous pattern sources. Techniques are provided to determine a computationally inexpensive upperbound on the true score or joint probability of the field label and field features over all field labels. Candidate field labels associated with promising upperbound scores are dynamically queued. True scores are computed for a subset of the candidates fields resulting in reduced computations to determine a field label. Techniques are also provided to determine optimal variables for any system with shared constraints.

16 Claims, 7 Drawing Sheets

| 1 | e | s | a |
|---|---|---|---|
| 2 | a | v | e |
| 3 | g | r | b |
| • | • | • | • |
| • | • | • | • |
| • | • | • | • |
| c | c | c | c |

FIG. 12

| ORDERED POSITION | FIELD POSITION 1 | UPPERBOUND CONTRIBUTION | FIELD POSITION 2 | UPPERBOUND CONTRIBUTION | FIELD POSITION 3 | UPPERBOUND CONTRIBUTION |
|---|---|---|---|---|---|---|
| 1 | e | .99 | b | .95 | a | .85 |
| 2 | a | .85 | v | .89 | e | .76 |
| 3 | g | .80 | r | .65 | b | .32 |
| • | • | • | • | • | • | • |
| • | • | • | • | • | • | • |
| • | • | • | • | • | • | • |
| c | z | .01 | q | .02 | v | .01 |

FIG. 13

SYSTEMS AND METHODS FOR STYLE CONSCIOUS FIELD CLASSIFICATION

INCORPORATION BY REFERENCE

This Application incorporates by reference: entitled "DOCUMENT IMAGE DECODING USING AN INTEGRATED STOCHASTIC LANGUAGE MODEL" by A. Popak et al., filed May 12, 2000 as U.S. patent application Ser. No. 09/570,730; in its entirety.

BACKGROUND OF THE INVENTION

1. Field of Invention

This invention relates to techniques for style conscious field classification of isogenous patterns.

2. Description of Related Art

Conventional recognition systems have difficulty correctly classifying less than optimal patterns of text images. In attempts to improve classification using these conventional systems, some researchers have attempted to exploit style consistency information. Sarkar et al, in "Classification of Style Constrained Pattern Fields" in Proceedings of the Fifteenth ICPR, pp. 859–862, Barcelona 2000, IEEE Computer Society Press, and in "Style Consistency in Isogenous Patterns" in Proceedings of the Sixth ICDAR, pp. 1169–1174, Seattle, September 2001, each incorporated by reference in their entirety, discuss attempts to improve classification of patterns by determining the joint probabilities of the field label and field-features over all field labels. Due to dependencies among patterns in the field, these conventional systems require optimization of a field score over all possible field labels. However, the determination of joint probabilities of the field label and field-features over all field labels is computationally expensive. Moreover, the number of computations necessary to determine a field label increases exponentially with increasing field-length. This limits the application of these conventional systems for longer fields and larger texts.

SUMMARY OF THE INVENTION

The systems and methods according to this invention provide for style conscious field classification of isogenous or common origin patterns. The systems and methods according to this invention provide for style conscious field classification of isogenous image, audio and video patterns. Systems and methods according to this invention compute an upperbound value of the true score of a field label. Candidate field labels with promising upperbound values are dynamically queued. The systems and methods according to this invention determine an upper bound on the field-label conditional field-feature likelihood, for a subset of all possible field labels. The systems and methods according to this invention provide for optimization of any variables with shared or joined constraints.

DETAILED DESCRIPTION OF EXEMPLARY EMBODIMENTS

Figure 1:
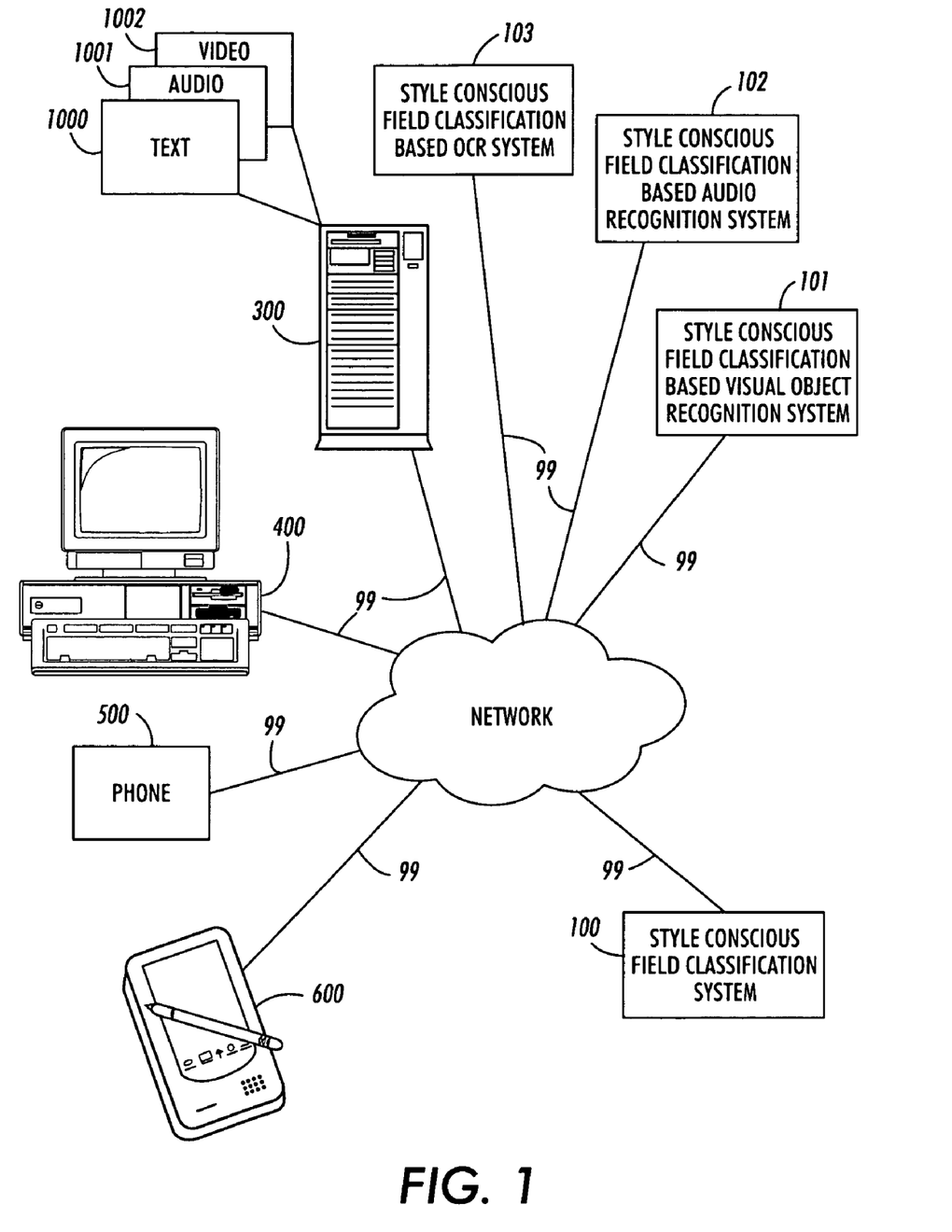
FIG. 1 is an overview showing an exemplary style conscious field classification system, according to this invention.

FIG. 1 is an overview showing an exemplary style conscious field classification system according to this invention. The style conscious field classification system 100, as well as style conscious field classification based visual object recognition system 101, style conscious field classification based audio recognition system 102 and style conscious field classification based OCR system 103 are connected via communications links 99 to web-enabled personal computer 400, phone 500, web-enabled portable device 600 and information repository 300. The information repository 300 contains text image patterns 1000, audio patterns 1001 and video patterns 1002.

In a first exemplary embodiment according to this invention, a user of web-enabled personal computer 400 forwards a request for the optical character recognition of text image 1000 to the style conscious field classification based OCR system 103. The text image patterns 1000 stored in information repository 300 may include PNG, TIFF, J-PEG, GIF, Adobe PDF image files and/or any known or later developed image format.

In response to the request, the style conscious field classification based OCR system 103 retrieves the requested text image patterns 1000 from information repository 300 via communications links 99. The style conscious field classification based OCR system 103 recognizes text associated with the text image patterns. For example, the style conscious field classification based OCR system 103 exploits the fact that character bitmaps in word generally share the same font. Since patterns of a class are likely to be rendered less variedly by a single source than by multiple sources, this information can be used to improve the classification process.

Style consistency modeling can be divided into weak and strong style consistency. Weak style consistency includes indicating how "a" is written the same way each time by the same author. Strong style consistency determines the dependencies between the letters. For example, how "a" looks depends on how "b" looks. Strong style consistency is especially useful when the fields are not long enough for conventional classification systems to determine the parent style. The style conscious field classification based OCR system 103 uses these determined interdependencies to improve classification. After recognizing the text associated with the text patterns, the style conscious field classification system 103 forwards the recognized text to the personal computer 400 via communications links 99.

In various other exemplary embodiments of this invention, style field classification based field recognition may be used in conjunction with optical character recognition systems without departing from the scope of this invention. For example, an optical character recognition product such as ScanSoft Corporation's TextBridge® product may be used to perform pre-processing operations such as layout analysis, segmentation and the like. Character recognition is then determined by the style conscious field classification based OCR system 103 as discussed above.

It will be apparent that in various other exemplary embodiments according to this invention, the style conscious classification system 100 may be located within web-enabled portable device 600 and/or form part of a handwriting recognition circuit and/or software routine within web-enabled portable device 600. For example, a style conscious field classification based handwriting recognition system (not shown) may be included within web-enabled portable device 600 to improve the recognition of handwritten patterns. Text recognized from the handwritten patterns is then suitable for further processing such as editing and the like. In various other exemplary embodiments of this invention, a generalized style conscious field classification system 100 placed at any location accessible via communications links 99 is used to recognize patterns in various types of isogenous information.

In a third exemplary embodiment according to this invention, a user of phone 500 may initiate a speech based request for text image patterns 1000 stored in information repository 300. The audio patterns of the speech based request are forwarded to the style conscious field classification based audio recognition system 102. Sampled features in the signal frames of the speech segments are used to recognize phonemes and/or words. Since the audio patterns originate from the same source, the user of phone 500, style consistency such as same-speaker intonation, accent and the like can be used to improve the accuracy of the recognition.

The recognized audio text corresponding to the speech request is then forwarded to the information repository 300. The object of the voice or speech request, the text image patterns 1000, are then forwarded to a display device associated with the user. It will be apparent that the display device may include a facsimile machine, a text to speech synthesizer or any known or later developed method of output or display. It should be noted that the style conscious field classification system 100 may also be incorporated directly within phone 500, placed within information repository 300 or placed at any location accessible via communications links 99.

In a fourth exemplary embodiment of this invention, a user of web-enabled personal computer 400 requests the recognition of visual objects in video patterns 1002 contained within information repository 300. The request is forwarded to the style conscious field classification based visual object recognition system 101. For example, a user of web-enabled personal computer 400 may request the recognition of a corporate logo, insignia or other visual object in the video patterns of a movie. The style conscious field classification based visual object recognition system 101 recognizes visual objects in the video patterns of the movie and attempts to determine all instances of the specific corporate logo or insignia. Various other embodiments of the systems and methods of this invention may be used to automatically determine objects and/or user actions or responses in a computer monitored or smart environment. For example, various user actions may be recognized and automated responses determined.

The style conscious field classification based visual object recognition system 101 exploits the style consistency in video patterns to improve visual object recognition despite camera angle changes, focus and other changes within the video patterns 1002. In various other exemplary embodiments of this invention, indices into the video patterns may be returned indicating all video locations containing the recognized visual objects.

In various other exemplary embodiments of this invention directed to audio patterns processing, the style conscious field classification based audio recognition system 102 is used to filter telephone, television, radio and other audio patterns for keywords. For example, keyword audio monitoring can be used to automatically monitor press coverage of a company, a product or any topic of interest.

Figure 2:
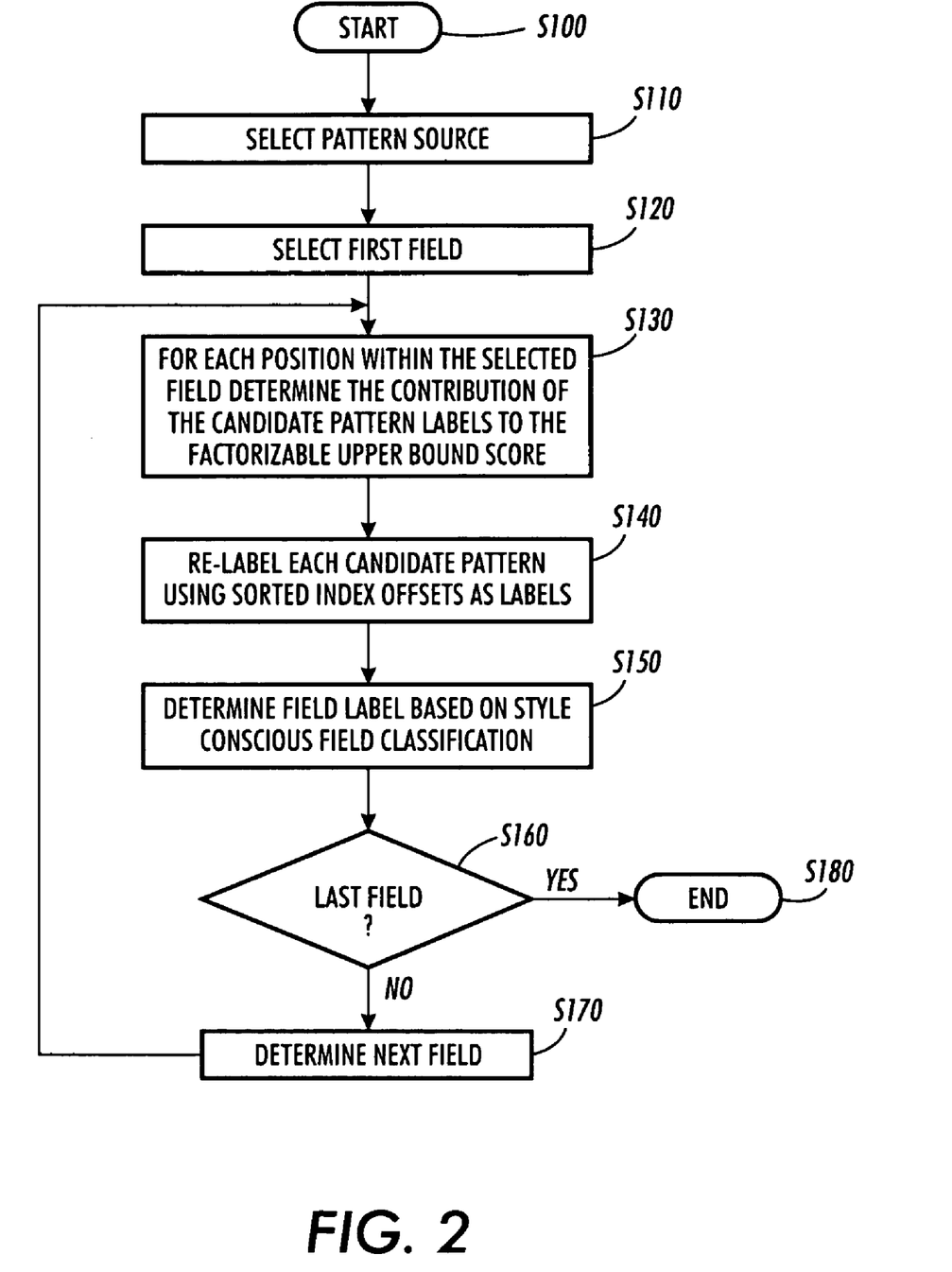
FIG. 2 is an exemplary pattern recognition flowchart showing pattern recognition based on an exemplary method of style conscious field classification according to this invention.

FIG. 2 is an exemplary pattern recognition flowchart showing pattern recognition based on an exemplary method of style conscious field classification according to this invention. The process starts at step S100 and continues immediately to step S110 where the source of patterns is selected. As discussed above, the patterns may be selected from any isogenous source. For example, the text image patterns output from scanning of textual information, audio telephone conversations, radio and television audio broadcasts and video patterns such as television broadcasts, movies in MPEG, motion-JPEG, real-video or any other known or later developed source of isogenous patterns. After the source of patterns has been selected, control continues to step S120.

In step S120, a first field within the isogenous patterns is selected. For example, if the isogenous patterns are text image patterns, the first field is likely to be a word composed of discrete characters. The field is selected and control continues to step S130. For speech based audio patterns, phonemes and/or speech utterances are determined.

The contribution of the candidate pattern labels to the factorizable upperbound score are determined for each position in the field in step S130. In various exemplary embodiments according to this invention, the contribution of each pattern label is determined and stored in an array in memory or any known or later developed method of storing information. After the contribution of each pattern label to the factorizable upperbound score is determined, control continues to step S140.

In step S140 of an exemplary embodiment according to this invention, each candidate pattern label is re-labeled using the sorted index offsets as labels. However, it will be apparent that re-labeling of candidate fields is used merely to facilitate discussion of the various candidate field labels. Thus, in various other exemplary embodiments, the candidate field labels may be used directly without departing from the scope of this invention. Control then continues to step S150.

Figure 3:
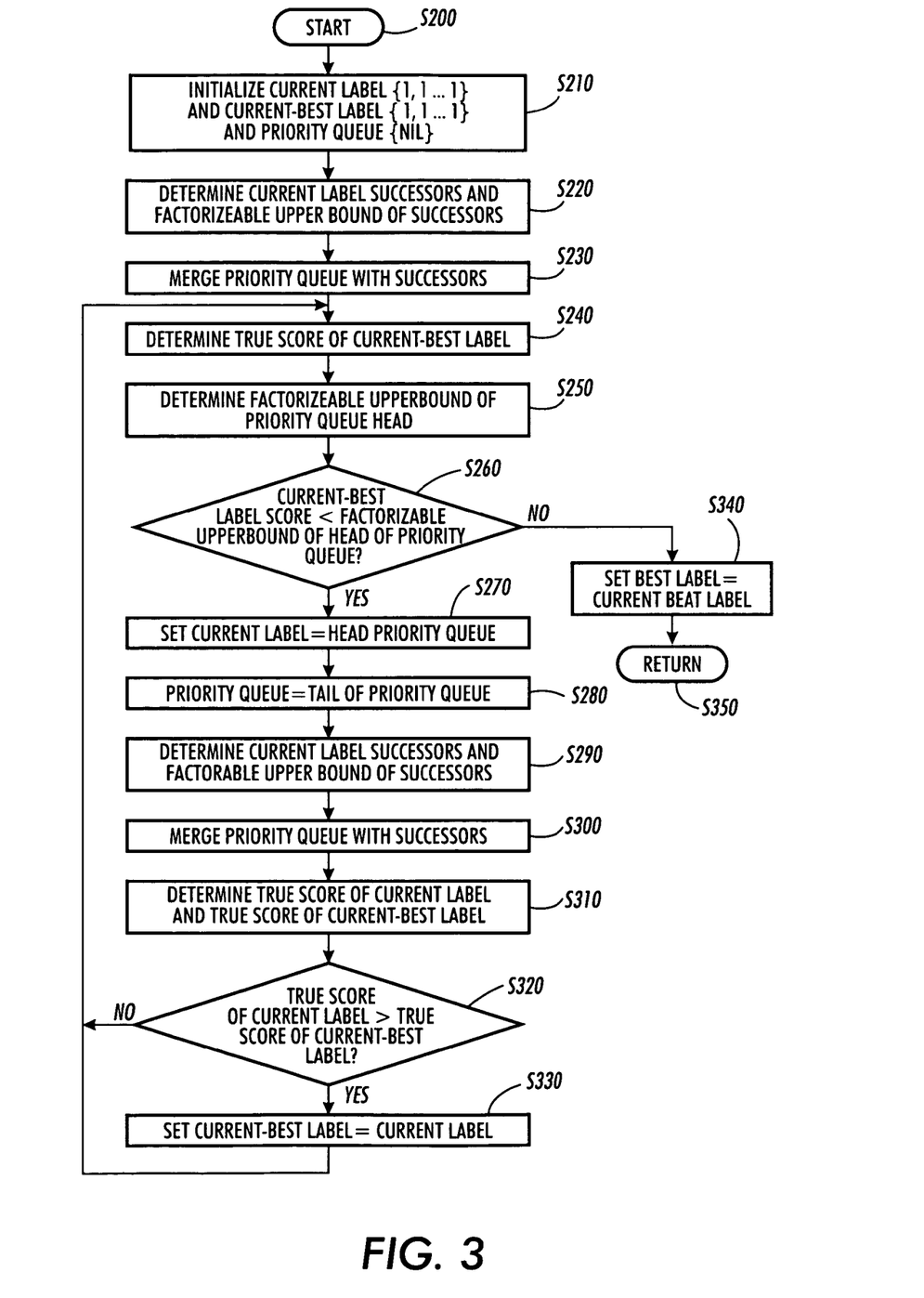
FIG. 3 is an expanded flowchart of an exemplary method of style conscious field classification according to this invention.

In step S150, a field label is determined using a style conscious field the exemplary method of style conscious field classification shown in the expanded flowchart of FIG. 3. After the field label is determined in step S150, control continues to step S160.

In step S160, a determination is made whether the last field in the pattern source has been reached. If the current field is not the last field, control continues to step S170 where the next field in the pattern source is determined. After the next field in the pattern source is determined, control continues to step S130 and steps S130–S160 are repeated until the last field in the pattern source is determined. When it is determined in step S160 that the current field is the last field in the pattern source, control continues to step S180 and the process ends.

It will be apparent that the method for style conscious field classification according to this invention may output different types of recognized patterns based on the type of isogenous patterns serving as input and the types of features chosen to represent the recognized patterns without departing from the scope of this invention.

FIG. 3 is an expanded flowchart of an exemplary method of style conscious field classification according to this invention. Index labels used to label candidate fields are used here merely for discussion purposes. Any method of labeling candidate field labels may be used in the practice of this invention. The current label $\{1,1,1\}$ indicates the current candidate label is associated with best candidate pattern labels in the first, second and third positions. Similarly a current label of $\{2,2,1\}$ indicates second best candidate pattern label in the first position, second best candidate pattern label in the second position and the best candidate pattern label in the third position. The ordering of candidate pattern-labels is according to their contribution to an upperbound score as discussed later. As discussed above, the index representation of candidate field labels is used merely for discussion purposes and it will be apparent that any data structure and/or labeling of candidate field labels and any data structure useful for storing candidate field labels may be used in the practice of this invention.

The exemplary style conscious field classification starts at step S200 and immediately continues to step S210 where a current label, a current-best label and a priority queue are initialized. In one exemplary embodiment according to this invention, the current label and the current-best label are maintained as lists of elements initialized to the values $\{1,1,1\}$. The priority queue is maintained as a list of elements initialized to NIL or the empty list $\{\ \}$. In various other exemplary embodiments according to this invention, the list of elements in the current label, the current-best label and the priority queue may be stored in a heap data structure, an array in memory or any known or later developed method of storing the label and priority queue information. After initializing the current label, the current-best label and the priority queue information, control continues to step S220.

In step S220, the successor labels of the current label are determined. The successors of the current label are determined by increasing each successive index position by one, until a maximum number of classes C is reached. For example, assuming the current label is $\{1,2,1\}$ and C=2, then successors of the current label $\{1,2,1\}$ are $\{(1+1),2,1\}$ and $\{1,2,(1+1)\}$ which simplify to $\{2,2,1\}$ and $\{1,2,2\}$. After the successor labels of the current label are determined, control continues to step S230.

The priority queue of labels is merged with the previously determined successors of the current label in step S230. For example, a factorizable upperbound score may be determined for each successor label entry to be added to the priority queue. The determination of the factorizable upperbound is discussed further below. Successor label entries are then merged into the priority queue based on the determined factorizable upperbound score for each associated successor label. This ensures that the head or first label element of the priority queue is associated with the highest factorizable upperbound score. It should be noted that the term factorizable refers to the ability to express the upperbound as a combination of terms each of which depends one exactly one position in the field. For example, in various exemplary embodiments according to this invention, operations such as addition, multiplication and the like may also be used to practice the invention. Control continues to step S240.

In step S240, the true score of the current best-label is determined. In one exemplary embodiment according to this invention, the true score is determined based on the formula for the field-label conditional field-feature probability as follows:

$$f(c_1, c_2 \ldots c_L) = \tag{1}$$

$$p(x_1, x_2 \ldots, x_L \mid c_1, c_2, \ldots, c_L) = \sum_{k=1}^{K} p_k \prod_{l=1}^{L} p(x_l \mid c_l, k)$$

for a field of L patterns with field features $(x_1, x_2, \ldots x_L)$, where $(c_1, c_2, \ldots c_L)$ denote a field label and where each pattern-label $c_1$ takes values 1 through C and there are K styles indexed by $k=1 \ldots K$. Although the exemplary embodiment of this invention discusses the use of the field label conditional field-feature probability, it will be apparent that any known or later developed method of determining joint field-label probabilities may also be used in the practice of this invention. After the field label conditional field-feature probabilities are determined, control continues to step S250.

In step S250, a factorizable upperbound score is determined for the first element or head of the priority queue. In one of the exemplary embodiments of this invention, the factorizable upperbound is determined based on a field-label conditional field-feature likelihood as follows:

$$f(c_1 \ldots c_L) \leq \max_k \prod_{l=1}^{L} p(x_l \mid c_l, k) \tag{2}$$

However, the max function in equation (2) can be moved to derive the equivalent inequality:

$$f(c_1 \ldots c_L) \leq \prod_{l=1}^{L} \max_k p(x_l \mid c_l, k) \tag{3}$$

Inequality (3) then yields an easily factorizable upperbound for the true score for any field label. After the factorizable upperbound score is determined for the label at the head of the priority queue, control continues to step S260.

In step S260, a determination is made whether the true score of the current-best label, determined in step S240, is less than the factorizable upperbound of the head element of the priority queue determined in step S250. If it is determined that the true score of the current-best label is less than the factorizable upperbound of the head element of the priority queue, control continues to step S270. Otherwise control continues to step S340 where the best label is set equal to the current-best label. The best label is then returned as the most likely classification of the label. Control continues to step S350 and the process immediately returns to step S160 of FIG. 2.

In step S270, the value of the current label is set equal to the value of the head of the priority queue in step S270.

Control then continues to step S280. In step S280, the head of the priority queue is removed from the queue. It will be apparent that any method of manipulating the elements of a queue or any data structure associated with maintaining an ordered list of candidate field labels may be used in this invention. Control continues to step S290.

The successors of the current label are determined in step S290. As discussed above, the successors of the current label are determined by increasing successive index positions by one position each time until the maximum number of classes is reached. Control continues to step S300 where the adjusted priority queue is merged with the determined successors of the current label based on factorizable upperbound scores determined for each of the current label successors. Control continues to step S310.

In step S310, true scores the current label and the current-best label are determined based on formula (1) as discussed above. After the scores for the current field label and the current-best label are determined, control continues to step S320.

A determination is then made in step S320 whether the true score for the current label is greater than the true score of the current-best label. If it is determined that the true score of the current label is less than or equal to the true score of the current-best label, control jumps immediately to step S240 and the steps S240–S320 are repeated.

If it is determined in step S320 that the true score for the current label is greater than the true score for the current-best label, control continues to step S330 where the current-best label is set equal to the current label. Otherwise, control then continues to step S240. The exemplary method for style conscious field classification ends when it is determined in step S260 that the score for the current-best label is less than the factorizable upperbound of the head element of the priority queue. Control then continues to step S350 and returns immediately to step S170 of FIG. 2 where the next pattern field is selected for classification.

Figure 4:
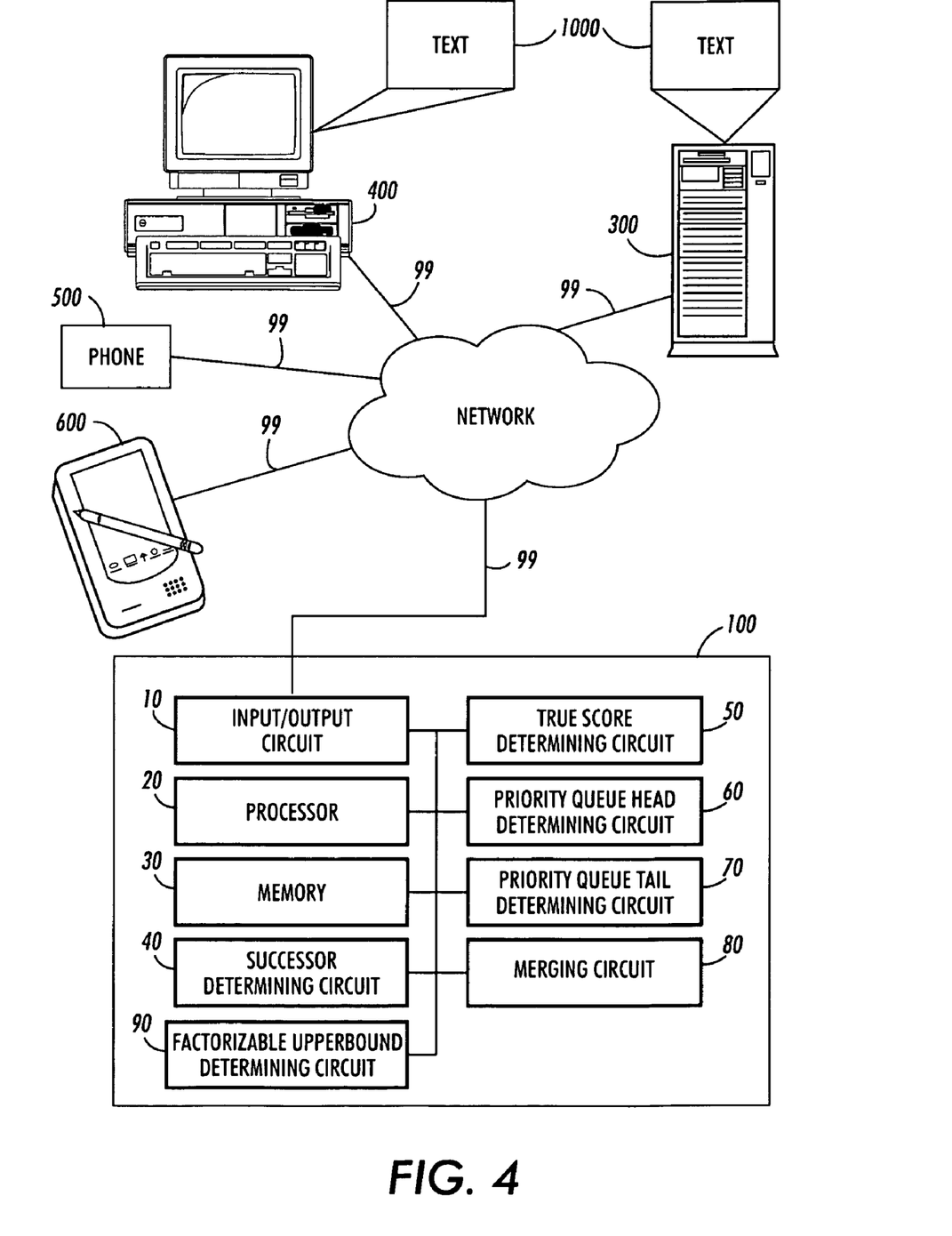
FIG. 4 is an exemplary style conscious field classification system according to this invention.

FIG. 4 shows an exemplary style conscious field classification system 100. The style conscious field classification system 100 comprises a processor 20, a memory 30, a successor determining circuit 40, a true score determining circuit 50, a priority queue head determining circuit 60, a priority queue tail determining circuit 70, a merging circuit 80 and a factorizable upperbound determining circuit 90 each connected to input/output circuit 10. The style conscious field classification system 100 is connected via communications links 99 to the information repository 300 containing text image patterns 1000, a web-enabled personal computer 400 containing text image patterns 1000, a phone 500 and a web-enabled portable device 600.

In one of the various exemplary embodiments according to this invention, the text image 1000 stored in web-enabled personal computer 400 is forwarded via communications links 99 to the style conscious field classification system 100 for the determination of recognized textual information. In various other exemplary embodiments according to this invention, the text image patterns 1000 contained in information repository 300 are forwarded via communications links 99 to the style conscious field classification system 100. However, it will be apparent that the style conscious field classification system 100 may be located at any point accessible via communications links 99 or may be incorporated directly into a device such as phone 500 and/or web-enabled portable device 600.

The processor 20 retrieves the text image 1000 from input/output circuit 10 of the style field classification system 100 and stores the text image 1000 in memory 30. The processor 20 determines the first field in the text image 1000. The contributions of candidate pattern labels to the factorizable upperbound score for each position within the field are determined. In various exemplary embodiments according to this invention, the contribution of each pattern label is stored in memory 30 as an array or the like. The processor 20 then optionally re-labels each candidate pattern based on the sorted index offsets as labels. The current label and current-best label data structures are initialized. For example, a list data structure may be used to store current label and current-best label information in an easily accessible data structure. In a first exemplary embodiment of this invention, lists associated with the current label and current-best label are initialized by assigning the values $\{1,1,\ldots 1\}$ The priority queue is then initialized. As discussed above, the initialization of the priority queue may set the number of labels in the queue to zero by adding a NIL value indicator to the priority queue. It will be apparent that the current label, current-best label and priority queue data structures are merely exemplary and that any known or later developed data structure useful in holding and accessing the current label, current-best label and priority queue information may be used.

The processor 20 transfers the current label information stored in current label data structure of memory 30 to the successor determining circuit 40. The successor determining circuit 40 determines successive labels based on the current label information. As discussed above, the current label successors are determined by successively increasing each index label by one until the maximum number of classes is reached. Thus for the current label $\{1,2,1\}$ the determined successors would be $\{(1+1), 2,1\}$ and $\{1,2, (1+1)\}$ which simplify to $\{2,2,1\}$ and $\{1,2,2\}$.

The processor 20 then merges the determined successors of the current label by activating the merging circuit 80 with the priority queue information based on the factorizable upperbound score obtained by activating the factorizable upperbound determining circuit 90. The true score determining circuit 50 is then activated to determine the true score value of the current-best label. The processor 20 activates the priority queue head determining circuit 60 to determine the head element of the priority queue data structure. The factorizable upperbound score determining circuit 90 is activated with the head element to determine a factorizable upperbound score for the field label. The processor 20 then compares the score of the current-best label to the factorizable upperbound score of the head element.

If processor 20 determines that the true score of the current-best label is greater than the factorizable upperbound of the head element, then the best label has been determined and processing ends. Otherwise, processor 20 sets the value of the current label data structure equal to the previously determined value of the head element of the priority queue. The head element of the priority queue is then removed from the priority queue.

The processor 20 activates the successor determining circuit 40 with the current label value stored in the current label data structure of memory 30. The merging circuit 80 is then activated to merge the determined successors of the current label with the field labels in the priority queue.

The score determining circuit 50 is activated with the current label stored in the current label data structure of memory 30. The true score determining circuit 50 is also activated with the current-best label stored in the current-best label data structure of memory 30. The determined current label score and the current-best label score are then compared by processor 20.

If processor 20 determines that the true score of the current label is greater than the true score of the current-best label, the value of the current-best label is set to the value of the current label. Otherwise, the processor 20 activates the true score determining circuit 50 with the newly determined current-best label, activates the factorizable upperbound determining circuit 90, compares the true score of the current-best label to the factorizable upperbound of the head of the priority queue, sets the current label equal to the head of the priority queue, removes the head label from the priority queue, activates the successor determining circuit based on the value of the current label, merges the priority queue with the determined current label successors, compares determined scores of the current label and the current-best label, sets the current-best label equal to the current label if the true score of the current label is greater than the true score of the current-best label score.

This processor 20 continues the sequence until the true score of the current-best label is more than the factorizable upperbound of the head element of the priority queue. The best label is then set equal to the current-best label. The process continues for successive fields within the source patterns of text image 1000 until no further patterns remain to be processed. The cumulative determined best labels are the determined recognized text.

Figure 5:
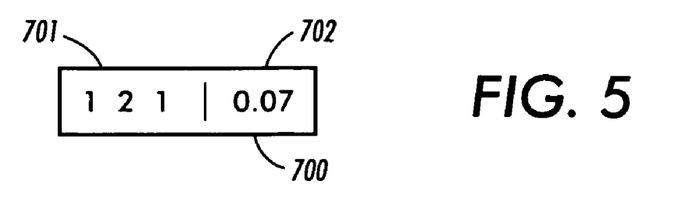
FIG. 5 shows an exemplary data structure for storing current label information according to this invention.

FIG. 5 shows an exemplary data structure for storing current label information according to this invention. The exemplary current label data structure 700 is comprised of a label portion 701 and associated upperbound portion 702. For example, the current label data structure 700 contains current label {1,2,1} in the label portion 701. The values indicate the best, second best and best candidate patterns. The current label data structure 700 contains an upperbound score of "0.07" in the upperbound portion 702. The "0.07" value of the upperbound portion is the product form of the upperbound score obtained by adding, multiplying or performing some other separable operation on contributions of each associated pattern label to the upperbound score. It will be apparent that the upperbound scores are easily determined based on accumulations of previously determined upperbound scores associated with the respective candidate patterns for each position in the field.

Figure 6:
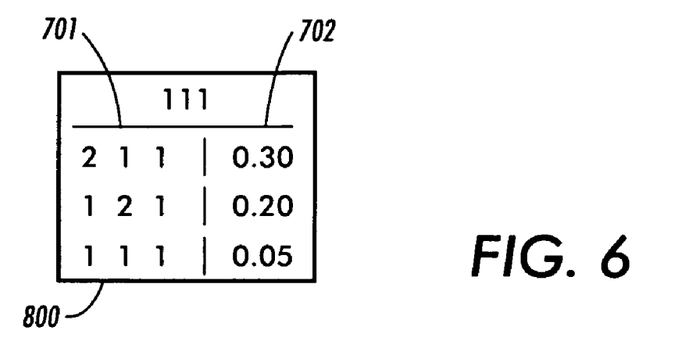
FIG. 6 shows an exemplary successor labels according to this invention.

FIG. 6 shows the exemplary determination of successor labels according to this invention. The first row is the label {1,1,1} of which the second, the third and the fourth rows form the successors. For example, the first position in the first row is incremented by one, until the maximum number of classes is reached. In the example, the number 2 is the maximum number of classes. The second position is then selected and similarly incremented until the maximum number of classes is reached. The third position selected and so on, for each field position. The determined labels form the successors of the label {1,1,1}. It will be apparent that the maximum number of classes may take various values depending on the pattern source and the patterns to be classified.

Figure 7:
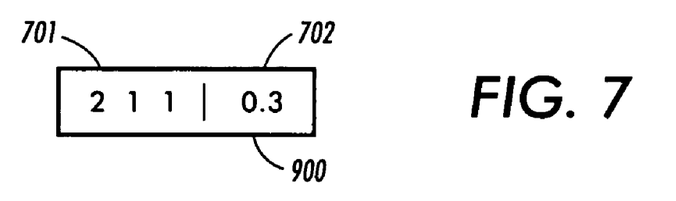
FIG. 7 shows an exemplary data structure for storing current-best label information according to this invention.

FIG. 7 shows an exemplary data structure for storing current-best label information according to this invention. The exemplary current-best label data structure 700 is comprised of a label portion 701 and associated upperbound portion 702. For example, the current-best label data structure 700 contains current-best label {2,1,1} in the label portion 701. These values indicate the current-best candidate field label is associated with the second best, best and best candidate patterns in the first, second and third positions of the candidate field. The current label data structure 700 contains an upperbound score of "0.3" in the upperbound portion 702. The "0.3" value of the upperbound portion is the product form of the upperbound score. It will be apparent that the upperbound scores are easily determined based on accumulations of previously determined contributions to the upperbound score associated with each respective candidate pattern label.

Figure 8:
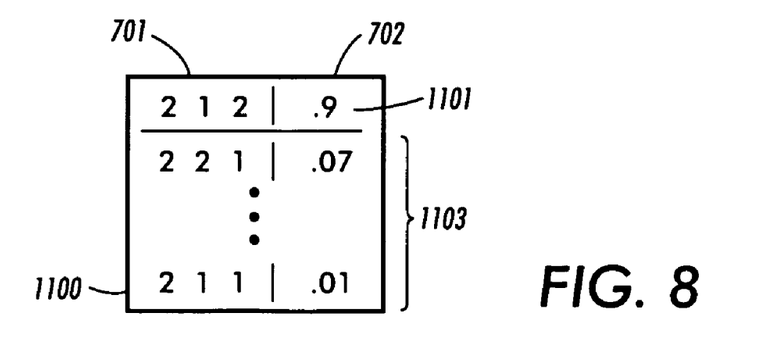
FIG. 8 shows an exemplary data structure for storing priority queue information according to this invention.

FIG. 8 shows an exemplary data structure for storing priority queue information according to this invention. The priority queue data structure 1100 comprises label portions 701 and upperbound portions 702. The priority queue data structure 1100 has a head portion 1101 or first element and a tail portion 1103. The head portion 1101 of the priority queue data structure 1100 comprises a label portion 701 and an associated upperbound portion 702 containing the determined upperbound score for the first label portion 701.

The tail portion 1103 of the priority queue data structure 1100 comprises field label portions 701 and associated upperbound portions 702 for each succeeding element of the priority queue data structure 1100 after the head element. The head portion 1101 and tail portion 1103 of the priority queue data structure 1100 are ordered based on the value of the associated upperbound portion 702. As discussed above, the upperbound score is easily determined through accumulations of associated candidate patterns.

Figure 9:
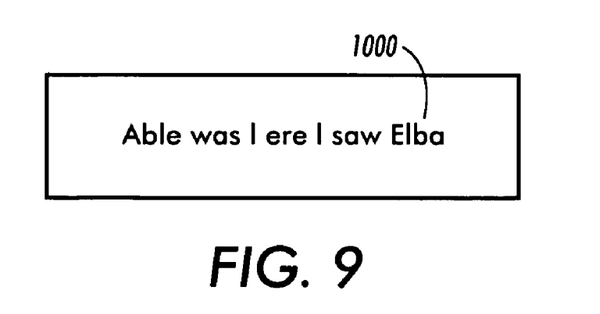
FIG. 9 shows an exemplary portion of a text pattern.

FIG. 9 shows an exemplary portion of a text image. Recognized and adjusted text is determined based on the text image 1000.

Figure 10:
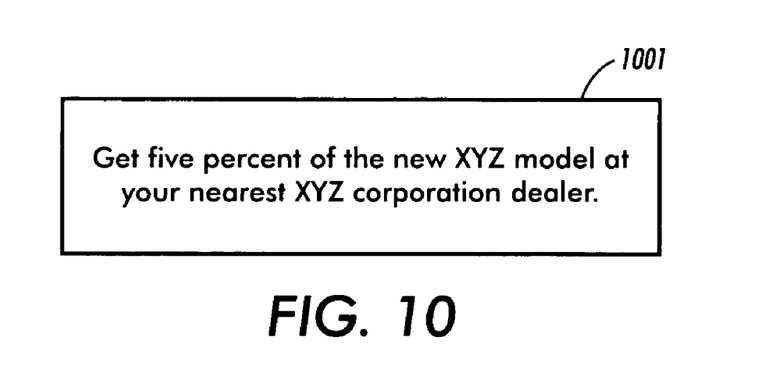
FIG. 10 shows an exemplary portion of an audio pattern.

FIG. 10 shows an exemplary portion of audio information 1001. Recognized and adjusted audio information is determined based on the audio information 1001. For example, the audio information 1001 contains a portion of a broadcast television commercial transcript. The recognized and adjusted text determined using this invention facilitates monitoring of a product advertising campaign by identifying "XYZ corporation" in the audio broadcast.

Figure 11:
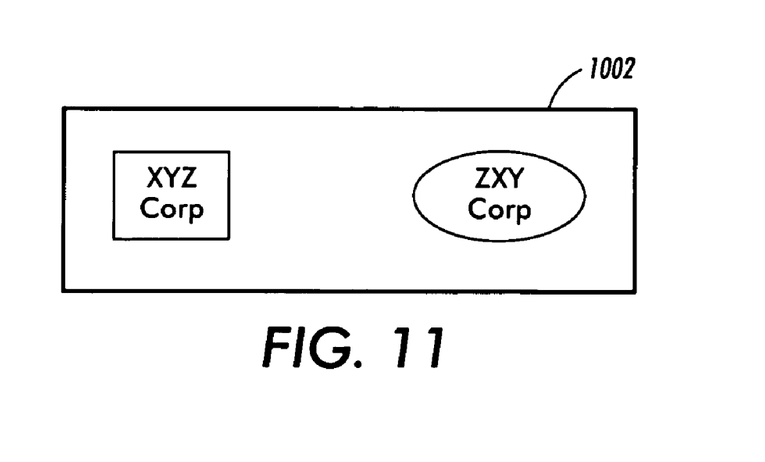
FIG. 11 shows an exemplary portion of a video pattern.

FIG. 11 shows an exemplary portion of video information 1002. The Recognized and adjusted video object information is determined based on the video information 1002. For example, video objects in a television broadcast are recognized and monitored for the "XYZ Corp" logo.

Figure 12:
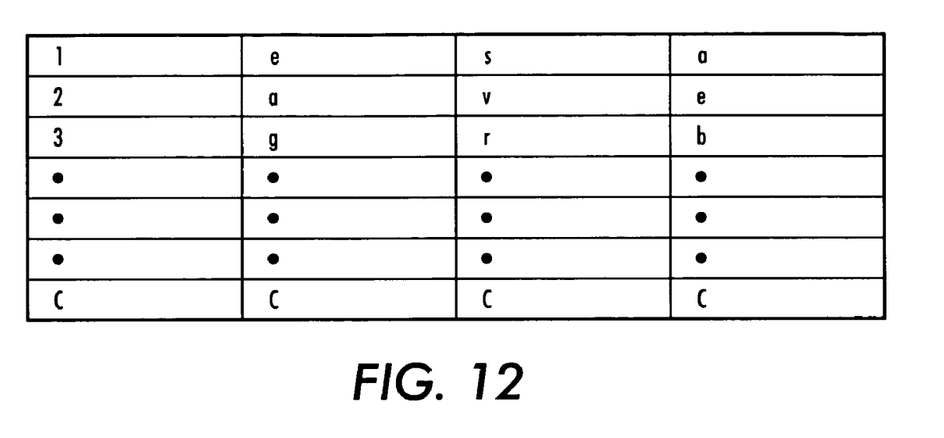
FIG. 12 shows an exemplary data structure for storing patterns associated with a field.

FIG. 12 shows an exemplary data structure for storing patterns associated with a field. For example, the label index associated with the field "ere" is shown. The first row contains the best candidate pattern labels for each position corresponding to a label of {1,1,1}. The second row corresponds to the second best candidate patterns for each position. The label associated with "ere" is {1,3,2}.

Figure 13:
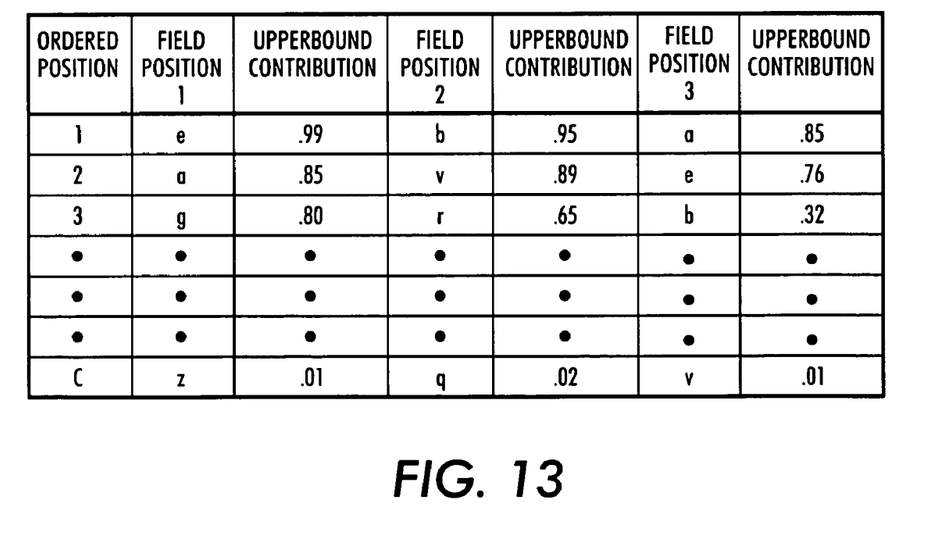
FIG. 13 shows an exemplary data structure for storing factorizable upperbound contribution values associated with patterns in a field according to this invention.

FIG. 13 shows an exemplary data structure for storing factorizable upperbound contribution values associated with patterns in a field, according to this invention. The first column portion of the exemplary data structure store the ordered position of the candidate pattern based on contributions to the upperbound score. For example, the first row contains all best candidate entries. The second column contains the values of the associate sorted candidate pattern labels for the first position. The third column is the contribution to the factorizable upperbound score of the second column value. The field position and contribution to upperbound score are repeated for each position in the current field. It will be apparent however, that various other data structures may also be used to store factorizable upperbound contribution values associated with the candidate pattern labels in a field without departing from the scope of this invention.

For example, the first row contains the ordered position value "1" indicating the best candidate pattern values. The best candidate pattern label in the first field position is "e"

which makes a contribution of "0.99" to the upperbound score. Similarly the best candidate pattern label for the second field position is a "b" which makes a contribution of "0.95" to the factorizable upperbound. The best candidate pattern label for the third field position is an "a" which makes a contribution of "0.85" to the factorizable upperbound. As discussed above, in alternative implementations, cumulative factorizable upperbounds are easily determined for the label {1,1,1} by accumulating the corresponding values {0.99×0.95×0.85}. As discussed above, the values may be accumulated using addition, multiplication or any suitable function without departing from the scope of this invention.

Each of the circuits 10–20 and 40–90 of the system for style conscious field classification 100 outlined above can be implemented as portions of a suitably programmed general-purpose computer. Alternatively, 10–20 and 40–90 of the system for style conscious field classification 100 outlined above can be implemented as physically distinct hardware circuits within an ASIC, or using a FPGA, a PDL, a PLA or a PAL, or using discrete logic elements or discrete circuit elements. The particular form each of the circuits 10–20 and 40–90 of the system for style conscious field classification 100 outlined above will take is a design choice and will be obvious and predictable to those skilled in the art.

Moreover, the system for style conscious field classification 100 and/or each of the various circuits discussed above can each be implemented as software routines, managers or objects executing on a programmed general purpose computer, a special purpose computer, a microprocessor or the like. In this case, the system for style conscious field classification 100 and/or each of the various circuits discussed above can each be implemented as one or more routines embedded in the communications network, as a resource residing on a server, or the like. The system for style conscious field classification 100 and the various circuits discussed above can also be implemented by physically incorporating the system for style conscious field classification 100 into a software and/or hardware system, such as the hardware and software systems of a web server or a client device.

As shown in FIG. 3, memory 30 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 4 can each be any known or later developed device or system for connecting a communication device to the system for style conscious field classification 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of style conscious field classification comprising the steps of:
   determining candidate field labels in an isogenous pattern source;
   determining an ordering of candidate field labels and associated upperbound scores in a list;
   while a determined true score for the candidate field label with the highest upperbound score<the upperbound score for all other candidate field labels in the list, removing the candidate field labels with the highest upperbound score; returning the determined candidate field label as the recognized field when the highest true score>the upperbound score for all other candidate field labels in the list.

2. The method of claim 1, wherein the ordering of field labels is at least one of ascending and descending.

3. The method of claim 1, wherein the list is at least one of an array, an associative array, a list, a linked list and a heap.

4. The method of claim 1, wherein the isogenous patterns are at least one of audio, video, image and textual patterns.

5. The method of claim 4, wherein the at least one audio, video, image and textual patterns are linearly oriented.

6. A system for style conscious field classification comprising:
   a input/output circuit for receiving candidate fields labels from an isogenous pattern source;
   a processor that determines candidate field labels in an isogenous source and determines an ordering of candidate field labels and associated upperbound scores in a list;
   while a determined true score for the candidate field label with the highest upperbound score<the upperbound score for all other candidate field labels in the list, the process continues to remove the candidate field labels with the highest upperbound score; and returns the determined candidate field label as the recognized candidate field when the highest true score>the upperbound score for all other candidate field labels in the, list.

7. The system of claim 6, wherein the ordering of field labels is at least one of ascending and descending.

8. The system of claim 6, wherein the list is at least one of an array, an associative array, a list, a linked list and a heap.

9. The system of claim 6, wherein the isogenous patterns are at least one of audio, video, image and textual patterns.

10. The system of claim 9, wherein the at least one audio, video, image and textual patterns are linearly oriented.

11. Computer readable storage medium comprising: computer readable program code embodied on the computer readable storage medium, the computer readable program code usable to program a computer to a method of style conscious field classification for recognizing a candidate label comprising the steps of:

determining candidate field labels in an isogenous pattern source;

determining an ordering of candidate field labels and associated upperbound scores in a list;

while a determined true score for the candidate field label with the highest upperbound score<the upperbound score for all other candidate field labels in the list, removing the candidate field labels with the highest upperbound score;

returning the determined candidate field label as the recognized field when the highest true score>the upperbound score for all other candidate field labels in the list.

12. Computer readable storage medium comprising: computer readable program code embodied on the computer readable storage medium, the computer readable program code usable to program a computer for style conscious field classification for recognizing a candidate label comprising the steps of:

instructions for determining candidate field labels in an isogenous pattern source;

instructions for determining an ordering of candidate field labels and associated upperbound scores in a list;

instructions for while a determined true score for the field pattern label with the highest upperbound score<the upperbound score for all other candidate field labels in the list, removing the candidate field labels with the highest upperbound score;

instructions for returning the determined candidate field label as the recognized field when the highest true score>the upperbound score for all other candidate field labels in the list.

13. A method of style conscious field classification comprising the steps of:

determining candidate field labels in an isogenous pattern source;

determining an ordering of candidate field labels and associated lowerbound scores in a list;

while a determined true score for the field pattern label with the lowest lowerbound score>the lowerbound score for all other candidate field labels in the list, removing the candidate field labels with the lowest lowerbound score;

returning the determined candidate field label as the recognized field when the lowest true score<the lowerbound score for all other candidate field labels in the list.

14. A method of claim 1, wherein candidate field labels are not all sorted and only added to an ordered list as necessary.

15. A system for style conscious field classification comprising:

a input/output circuit for receiving fields labels from an isogenous pattern source;

a processor that determines candidate field labels in an isogenous source and determines an ordering of candidate field labels and associated lowerbound scores in a list;

while a determined true score for the candidate field label with the lowest lowerbound score>the lowerbound score for all other candidate field labels in the list the process continues to remove the candidate field labels with the lowest lowerbound score; and returns the determined field label as the recognized field when the lowest true score<the lowerbound score for all other field labels in the list.

16. The system of claim 6, wherein candidate field labels are not all sorted and only added to an ordered list as necessary.

* * * * *